United States Patent
Deivasigamani et al.

(10) Patent No.: US 9,119,153 B2
(45) Date of Patent: Aug. 25, 2015

(54) METHODS AND APPARATUS FOR IMPROVING POWER CONSUMPTION IN A WIRELESS NETWORK

(75) Inventors: Giri Prassad Deivasigamani, Cupertino, CA (US); Gaurav Nukala, Cupertino, CA (US); Srinivasan Vasudevan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 13/539,100

(22) Filed: Jun. 29, 2012

(65) Prior Publication Data

US 2013/0210420 A1 Aug. 15, 2013

Related U.S. Application Data

(60) Provisional application No. 61/597,656, filed on Feb. 10, 2012.

(51) Int. Cl.
*H04W 24/02* (2009.01)
*H04W 52/02* (2009.01)

(52) U.S. Cl.
CPC ........ *H04W 52/0251* (2013.01); *H04W 52/028* (2013.01); *H04W 52/0245* (2013.01); *Y02B 60/50* (2013.01)

(58) Field of Classification Search
CPC ............... H04W 52/0245; H04W 52/0251; H04W 52/028; Y02B 60/50
USPC .................................. 455/422–425, 572–575
See application file for complete search history.

(56) References Cited

U.S. PATENT DOCUMENTS

| 2004/0229659 A1* | 11/2004 | Boos et al. ................ 455/574 |
| 2008/0181127 A1 | 7/2008 | Terry et al. |
| 2008/0214249 A1 | 9/2008 | Kim et al. |
| 2010/0135159 A1 | 6/2010 | Chun et al. |

FOREIGN PATENT DOCUMENTS

| EP | 0812119 A2 | 12/1997 |
| EP | 2157830 A1 | 2/2010 |
| GB | 2450167 A | 12/2008 |

OTHER PUBLICATIONS

PCT/US2013/025598—International Search Report—Aug. 6, 2013.
PCT/US2013/025598—Written Opinion of the International Searching Authority—Aug. 6, 2013.
PCT/US2013/025598—International Preliminary Report on Patentability—Aug. 12, 2014.

* cited by examiner

*Primary Examiner* — Kashif Siddiqui
(74) *Attorney, Agent, or Firm* — Meyertons, Hood, Kivlin, Kowert & Goetzel, P.C.

(57) ABSTRACT

Methods and apparatus for power optimization in e.g., a wireless mobile device. In one embodiment, the optimization is effected via intelligent idle mode current drain management. In an exemplary LTE cellular network context, the user equipment (UE) only powers on its transceiver for a subset of Discontinuous Reception (DRX) cycles based on e.g., the quality of the radio environment, power considerations, location, etc. For example, if a UE has not moved, and its radio reception quality is good, the UE is likely to successfully receive a paging notification (i.e., without multiple attempts). Consequently, the UE configures itself to receive only a single paging indication.

15 Claims, 6 Drawing Sheets

METHODS AND APPARATUS FOR IMPROVING POWER CONSUMPTION IN A WIRELESS NETWORK

PRIORITY AND RELATED APPLICATIONS

This application claims priority to U.S. Provisional Patent Application Ser. No. 61/597,656 filed Feb. 10, 2012 and entitled "METHODS AND APPARATUS FOR IMPROVING POWER CONSUMPTION IN A WIRELESS NETWORK", which is incorporated herein by reference in its entirety.

This application is related to co-owned, U.S. Provisional Patent Application Ser. Nos. 61/585,207 filed on Jan. 10, 2012 and entitled "METHODS AND APPARATUS FOR POWER CONSUMPTION MANAGEMENT DURING DISCONTINUOUS RECEPTION", 61/585,209 filed on Jan. 10, 2012 and entitled "METHODS AND APPARATUS FOR MANAGING RADIO MEASUREMENTS DURING DISCONTINUOUS RECEPTION", and 61/587,097 filed on Jan. 16, 2012 and entitled "METHODS AND APPARATUS FOR ADAPTIVE RECEIVER MODE SELECTION DURING DISCONTINUOUS RECEPTION", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of mobile devices. More particularly, in one exemplary aspect, the present invention is directed to idle mode current drain optimization.

2. Description of Related Technology

Techniques to conserve battery life in mobile devices become increasingly important as mobile device use expands. Efficient battery usage corresponds directly to longer periods between battery charges, and improved transmission/reception capabilities. For this reason, battery life is one of the most salient contributors to overall product experience. Even so, battery components are typically the largest and heaviest components of a mobile device.

Moreover, newer telecommunications and mobile device technologies employ faster transfer speeds and larger displays which correspond to increased power consumption. For example, Multiple Input Multiple Output (MIMO) based antenna technologies greatly improve radio link performance by providing multiple antennas; unfortunately each antenna may consume significant amounts of power. Similarly, large backlit Liquid Crystal Displays (LCD), Organic Light Emitting Diode (OLED), etc. provide significantly improved display capabilities over older types of displays, but consume more power as well. For this reason, improved methods and apparatus for reducing power consumption in all areas of mobile device design are needed.

SUMMARY OF THE INVENTION

The present invention provides, inter cilia, improved apparatus and methods for reducing power consumption in a mobile device, such as through optimization of idle mode current drain.

In one aspect of the present invention, a method for power conservation in a mobile device is disclosed. In one embodiment, the method includes: determining when the mobile device is stationary; determining a low power mode based on one or more measured reception characteristics; and entering the determined low power mode, wherein the low power mode comprises skipping one or more paging occasions. In one such variant, the method further includes determining if paging performance will be degraded based on one or more historical measurements of performance e.g., one or more measurements of a Received Signal Strength Indicator (RSSI), one or more measurements of a Signal-to-Noise Ratio (SNR).

In another variant, the method further includes determining whether one or more previously received paging messages were decoded in a single attempt.

In yet another variant, the determination of whether the mobile device is stationary is based at least in part on Global Positioning System (GPS) coordinates.

In a further such variant, the determining if the mobile device is stationary is based at least in part on power levels of one or more cells measured during a previous higher power state.

The one or more paging occasions may includes skipping one or more Discontinuous Reception (DRX) cycles.

In a fifth variant, the mobile device includes a Long Term Evolution (LTE) compliant cellular device.

In a sixth variant, responsive to the measured one or more reception characteristics falling below an acceptable threshold, the mobile device resumes a normal operation.

In another embodiment, the mobile device includes a substantially redundant aspect of its operation, and method includes evaluating one or more parameters associated with the mobile device, and selecting only a subset of instances of the substantially redundant aspect during which to consume power, the selecting being based at least in part on the evaluating of the one or more parameters.

In one variant of this embodiment, the substantially redundant aspect comprises checking for incoming pages, such as via periodic or intermittent checks of a paging channel, and the one or more parameters include radio environment parameters that can be used to indicate the likelihood of the mobile device receiving the page(s).

In a second aspect of the present invention, a mobile device is disclosed. In one embodiment, the mobile device includes: a wireless receiver; a processor, coupled to the wireless receiver; and first computerized logic (e.g., computer programs, hardware circuits, firmware, or any combinations of the foregoing) configured to determine whether the mobile device is stationary; second computerized logic configured to, when it is determined that the mobile device is not stationary, decode one or more paging messages and perform one or more neighbor cell searches; and third computerized logic configured to, when it is determined the mobile device is stationary, decodes paging messages and does not perform neighbor cell searches.

In one variant, the mobile device further includes a Global Positioning System (GPS) receiver configured to determine one or more GPS coordinates.

In a second variant, the mobile device further includes configured to compare power levels of one or more cells measured during a previous higher power state.

In a third variant, the mobile device further includes logic configured to determine a low power mode based on one or more reception characteristics, the low power mode being configured to skip one or more paging occasions.

In another embodiment, the mobile device is powered by a power supply such as a battery, and is capable of optimizing power consumption. The device includes a wireless transceiver and logic in communication with the transceiver and configured to: evaluate one or more parameters associated with the mobile device; and select only a subset of instances of a substantially redundant aspect of the operation of the wireless transceiver during which to energize the transceiver. The selection by the logic is in one variant based at least in part on the evaluation of the one or more parameters (e.g., changes in radio environment, movement of the device, or other factors that may lead to reduced ability to receive pages or need to resynchronize the device's timing domain.

In a third aspect of the present invention, a method for power optimization of a mobile device in an idle state is disclosed. In one embodiment, the method includes: determining if the mobile device is stationary; determining whether signal performance on the mobile device exceeds a threshold level; and when the mobile device is stationary and signal performance exceeds the threshold level, increasing a length of the idle state.

In a first variant, increasing the length of the idle state includes increasing the Discontinuous Reception (DRX) cycle length.

In a second variant, the DRX cycle includes short DRX. Alternately, the DRX cycle includes long DRX.

In a third variant, the signal performance includes a decode performance of the Physical Downlink Control Channel (PD-CCH).

In a fourth variant, increasing the length of the idle state includes treating the entire next Discontinuous Reception (DRX) cycle as the idle state.

In a fifth variant, increasing the length of the idle state includes stopping searches for neighbor cells. In a fourth aspect of the invention, computerized logic useful with a mobile device is disclosed. In one embodiment, the logic comprises a computer-readable apparatus having a storage medium with a plurality of program instructions configured to, when executed, intelligently select a paging reception configuration for the mobile device so as to mitigate use of electrical power via unnecessary energization of one or more receive chain components.

Other features and advantages of the present invention will immediately be recognized by persons of ordinary skill in the art with reference to the attached drawings and detailed description of exemplary embodiments as given below.

Figure 1:
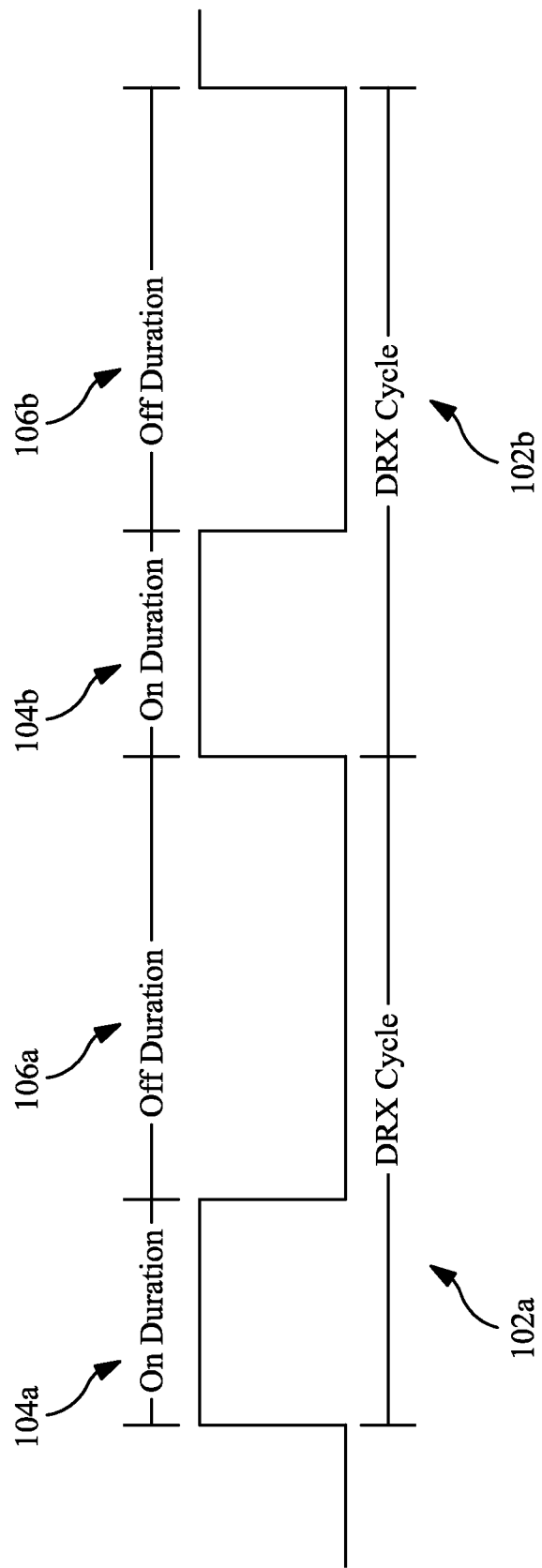
FIG. 1 is a graphical representation of one exemplary prior art Long Term Evolution (LTE) Discontinuous Reception (DRX) cycle.

All Figures © Copyright 2012 Apple Inc. All rights reserved.

DETAILED DESCRIPTION OF THE INVENTION

Reference is now made to the drawings, wherein like numerals refer to like parts throughout.

Overview

Modern wireless networks are built robustly with added redundancy to insure proper performance. For example, within the context of a Long Term Evolution (LTE) compliant network, the Discontinuous Reception (DRX) paging operation was designed to robustly page a user equipment (UE) by providing multiple paging opportunities.

In one salient aspect, the present invention provides methods and apparatus for improving or optimizing power consumption within a mobile wireless device. In one exemplary embodiment, idle mode current drain is optimized to achieve reduced power consumption and hence longer battery charge duration. Specifically, in one variant, the inherent robustness of network paging during "discontinuous" modes of operation (such as the DRX mode of an LTE or LTE-A network) is leveraged so as to reduce mobile device power consumption. Rather than powering the transceiver for each paging occasion, the user device (e.g., UE in the aforementioned exemplary LTE or LTE-A network) only powers on its transceiver for a subset of the paging occasions, where selection of the paging occasions to be sampled are "intelligently" selected in certain embodiments. For instance, in one such embodiment, the UE determines the duration of the subset based on e.g., the quality of the radio environment, power considerations, location, and/or other parameters. In one implementation, if a UE has not moved, and its radio reception quality is good, the UE is likely to properly receive a paging notification. Consequently, the UE will only power on long enough to receive a single paging indication.

Various other aspects of the present invention are directed to further optimizations based on mobile device power consumption during idle mode operation. For example, where a device has not significantly moved, certain DRX measurements can be minimized without adverse effect.

Discontinuous Reception (DRX)—

One area where power consumption can be greatly reduced is Discontinuous Reception (DRX). Modem wireless networks are built robustly with added redundancy to ensure proper performance. For example, within the context of a Long Term Evolution (LTE) compliant network, the Discontinuous Reception (DRX) paging operation was designed to robustly page a user equipment (UE) by providing multiple paging opportunities.

During DRX operation, the mobile device periodically enters a low power state and in some cases, turns the receiver completely off according to a pre-defined DRX schedule. The network ensures that messaging for the mobile device occurs only when the mobile device is on, This intermittent messaging scheme uses a Paging Occasion (PO) during each DRX cycle, where the PO is specified by a unique identifier for the UE (such as the UE's International Mobile Subscriber Identifier (IMSI)), and various DRX parameters (e.g., DRX length, etc.).

Furthermore, in order to guarantee that the mobile device maintains an accurate record of the current radio environment, each time the mobile device "wakes up" (powers up from a "sleep" state), the mobile device takes radio measurements and performs searches for other servers, etc. This updated information ensures that the mobile device has accurate information for e.g., mobility management (i.e., tracking a cellular device to efficiently deliver messaging). Common examples of DRX cycle measurements include without (i) serving cell measurements, (ii) neighbor cell measurements, (iii) intra-cell measurements, and (iv) inter-Radio Access Technology (inter-RAT) measurements.

Within the exemplary context of Long Term Evolution (LTE) networks, the UE monitors paging channels such as the Physical Downlink Control Channel (PDCCH) for a fixed time interval to receive pages. This time interval is set significantly longer than necessary to receive a single DRX page. The long time interval allows for multiple paging attempts to make sure that the UE can be reliably paged, even during intermittent access (e.g., where the UE is in a momentary area of poor reception).

Referring now to FIG. 1, a typical prior art Long Term Evolution (LTE) Discontinuous Reception (DRX) cycle is illustrated. As shown, the DRX cycles 102a, 102b each include an "ON" duration (104a, 104b) where the receiver is enabled and can receive paging messages. Conversely, during the "OFF" duration (106a, 106b) the receiver is not enabled and "sleeping". Each ON duration may span multiple subframes. The first symbols (one, two, or three) of each subframe (based on format type) contain the Physical Downlink Control Channel (PDCCH), the PDCCH contains paging indications (e.g., which identifies any paged UEs). Based on the PDCCH, a paged UE must decode the Physical Downlink Shared Channel to identify which Resource Blocks (RB) are allocated to it. The Physical Downlink Shared Channel (PDCCH) data occupies between three and seven symbols per slot depending on the allocation for PDCCH, and also whether a short or extended cyclic prefix is used.

DRX allows the UE to sleep during inactivity to reduce power consumption, while still providing sufficiently responsive connectivity. The length of the DRX cycle balances between reducing power consumption (by reducing transceiver activity), and connectivity latency. For example, certain types of applications are "sporadic" (e.g., web surfing, etc.), thus the UE does not need to constantly maintain an open connection. Different applications have different latency and performance requirements; accordingly, the DRX cycle is further divided into a "short" DRX cycle, and a "long" DRX cycle. Selection of short and long DRX cycles is managed either explicitly by the base station (for LTE, also referred to as an Enhanced NodeB (eNB)), or via a timer.

Consider the following examples where the length of DRX cycle is based on e.g., uplink/downlink activity requirements for each UE. With highly predictable traffic such as Voice over Internet Protocol (VoIP), the ON Duration 104a, 104b can be set to one subframe and the DRX cycle set to 20 ms or 40 ms. With sporadic traffic (such as web surfing), the ON Duration 104a, 104b can be set to one subframe and the DRX cycle set to every frame, or every other frame. After periods of long inactivity, the ON Duration 104a, 104b can be set to one subframe and the DRX cycle set to multiple frames (e.g., up to 256 frames).

DRX Measurements—

Those of ordinary skill in the related arts will recognize that longer DRX periods increase the probability that the base station (BS) and the UE may lose operational alignment (e.g., timing frequency, power, etc.). This can be further exacerbated by movement of the UE with respect to the BS. For example, loss of timing synchronization is highly undesirable, as the UE must reconnect to the network to re-establish timing lock. Furthermore, the radio environment may change significantly while the UE is sleeping. For example, during the OFF duration (106a, 106b), a UE may have moved farther away from its original serving cell's reception, and closer to a neighbor cell. Optimal network performance requires that the UE "handover" to the closer neighboring cell. For at least these reasons, the prior art UEs continuously monitor their radio environment during each ON duration.

For example, during each DRX cycle, a UE performs a variety of measurements to ensure that it remains aligned with its serving cell, and that the serving cell is still the optimal cell for the UE. Generally, cell selection/reselection/handover is based on a ranking criterion that is calculated from the neighbor cell strengths. At each DRX cycle, the UE measures the signal strength of any available neighbor cells (both inter-cell, and intra-cell) indicated in the neighbor cell list of the serving cell (the network may ban (blacklist) the UE from considering some cells). Additionally, the UE may perform inter-Radio Access Technology (RAT) measurements, which entails measuring reception quality of other nearby wireless technologies.

Methods—

The following discussion provides generalized methods for idle mode current drain optimization. In one implementation of the invention, the method involves in certain instances not reading paging channels or broadcast channels depending on e.g., movement, signal strength, etc.

Figure 2:
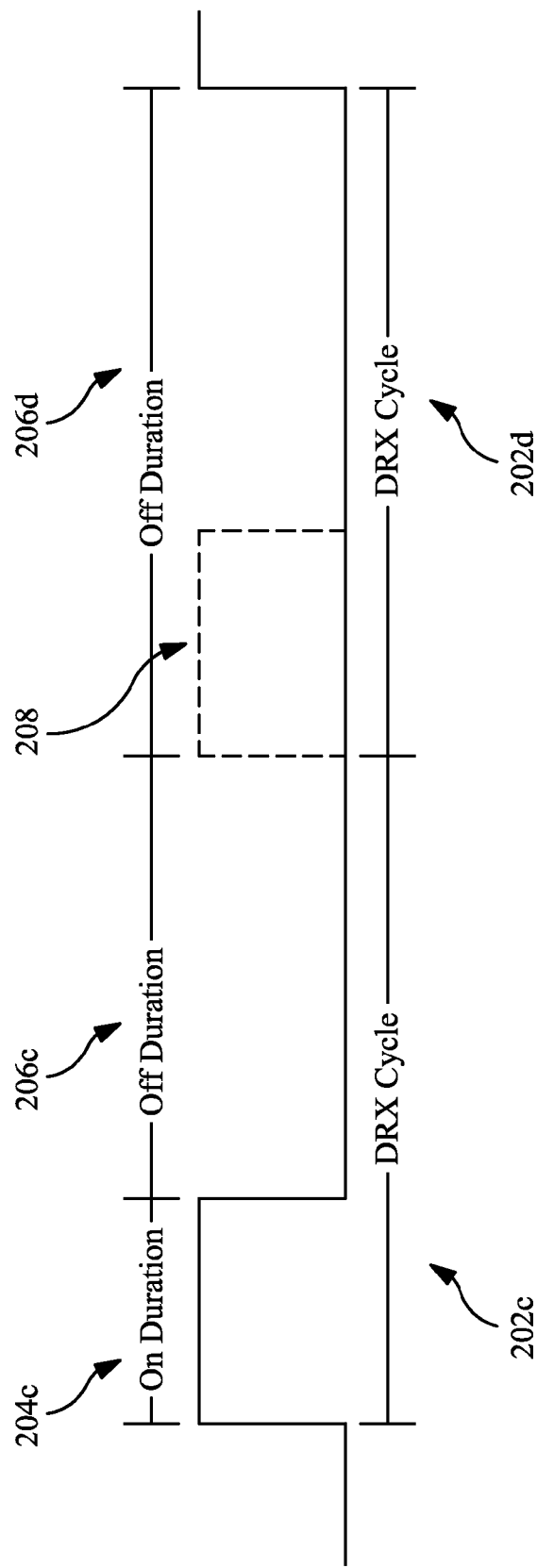
FIG. 2 is a graphical representation of one exemplary Long Term Evolution (LTE) Discontinuous Reception (DRX) cycle according to the present invention.

Referring now to FIG. 2, one exemplary Long Term Evolution (LTE) Discontinuous Reception (DRX) cycle according to the present invention is illustrated. As shown, the DRX cycle 202c has an ON duration 204c where the receiver may be on 204c; but during the DRX cycle 202d the UE skips the associated ON duration 208. As described in greater detail hereinafter, the UE can skip the ON duration in certain conditions, and advantageously leverage the inherent robustness of network paging during DRX operation. Rather than powering the transceiver for each paging occasion, the UE only powers on its transceiver for a subset of the paging occasions. Since the UE only powers on long enough to receive a single paging indication, the UE greatly reduces its overall DRX paging cycle burden. As described in greater detail hereinafter, the UE determines an appropriate subset of paging occasions based on e.g., the reception quality, power considerations, location, etc.

Moreover, ones of ordinary skill in the relevant arts will appreciate that the aforementioned operation may be disabled, and normal operation can resume where paging performance degrades below acceptable levels, or where additional signaling in the network is undesirable (e.g., where network congestion becomes a limiting factor for paging reception).

Figure 3:
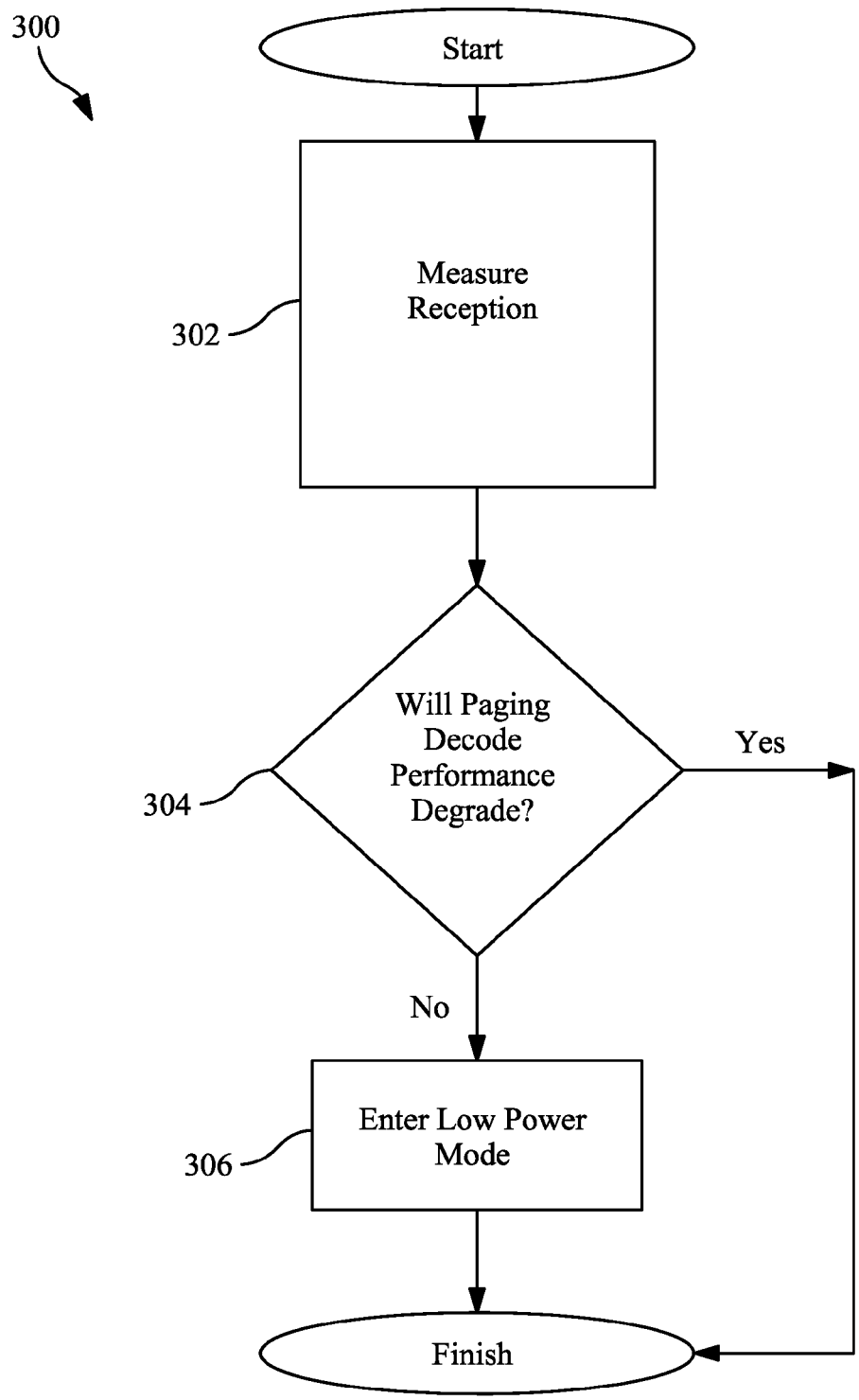
FIG. 3 is a logical flow diagram illustrating one generalized embodiment of a method of power conservation in a mobile device in accordance with the present invention.

FIG. 3 is a logical flow diagram of one generalized embodiment of a power conservation methodology for use in a mobile device, in accordance with the present invention.

At step 302 of the method 300, the mobile device measures one or more reception characteristics. Common examples of reception characteristics include without limitation: location, velocity, reception quality, change in reception quality, and data usage.

For example, in one implementation, the mobile device determines if it is stationary (or substantially unmoved). In one embodiment, device location and/or movement may be determined according to a Global Positioning System (GPS) coordinates, including GPS, Assisted GPS (A-GPS), or any other variants of satellite-based positioning. In other embodiments, the device location and/or movement can be determined based on triangulation via known reference signals (e.g., Wi-Fi beacons, etc.). or association with a known access point (e.g., base station, Wi-Fi hotspot or other AP). In still other embodiments, the device location and/or movement may be determined via other inputs (e.g., via accelerometer input, etc.).

Moreover, in certain use scenarios, the exact location and/or movement of the device may be unnecessary; rather, a determination that a change has occurred may be sufficient. For example, a mobile device may compare serving cell power levels to previously measured serving cell power levels to determine whether the radio environment has substantially changed. Similarly, measurements of neighboring cell power levels may be compared to previously measured neighbor cell power levels, etc.

In some variants, an added (or missing) cell may not necessarily indicate a true change in location. For example, femtocells and picocells can be turned on or off without significantly impacting a UE's network reception at the periphery. However, where a femtocell or picocell becomes available in the immediate vicinity of a UE, the UE may choose to update its cell selection/reselection heuristics (even where the UE has not moved).

In yet other embodiments, a mobile device may be aware of certain application requirements affected by DRX cycle latency. For example certain software applications may be more (or alternately less) tolerant of latency. Common examples of latency-tolerant applications include without limitation: web surfing, file transfers, buffered data, etc. Examples of latency sensitive applications include: streaming data (e.g., video, audio), VoIP, gaming data, etc.

Moreover, reception characteristics may further include historical measurements of performance. These measurements can include Received Signal Strength Indicator (RSSI) and Signal-to-Noise Ratio (SNR) of one or more received channels (e.g., a Physical Downlink Control Channel (PDCCH), Physical Downlink Shared Channel (PDSCH), etc.). Alternately, historical performance may be based on e.g., a number of successful or unsuccessful receptions. For example, a count of prior paging messages that were correctly decoded (e.g., based on a Cyclic Redundancy Check (CRC) result) in a single attempt may be used consistent with the invention.

At step 304, the mobile device determines if performance will likely deteriorate if a low power mode is triggered. In one variant, this determination is based on the measured one or more reception characteristics. If performance will not be degraded, the method logic flows to step 306, otherwise the method 300 completes.

In one exemplary implementation of the method 300, if the mobile device is stationary, then the mobile device can skip one or more paging cycles while maintaining acceptable paging decode performance. For example, where a LTE mobile device has not moved significantly, the mobile device configures itself to skip one or more DRX cycle ON durations. Since the mobile device has a high probability of decoding the paging messages on a first try, skipping DRX ON durations will not significantly impact operation. Similarly, in one alternative embodiment, if the mobile device has good reception quality, then the mobile device can configure itself for skipping one or more paging cycles. For example, where a LTE mobile device has high quality reception, the mobile device can configure itself to skip one or more DRX cycle ON durations.

It is appreciated that the logic for selecting which ON durations or paging cycles to skip can vary from very simple in nature (e.g., skip every other one, skip every third one, skip three in a row, then do not skip three in a row, etc.) to much more sophisticated analyses, such as algorithms for intelligently selecting the events to be skipped so as to optimize power consumption.

Still further, it is appreciated that various combinations of the foregoing may be necessary. For example, a mobile device may require a minimum threshold quality level; i.e., if the UE is not moving, but is in a relatively poor area of reception, the UE may opt to continue normal operation (e.g., remain in legacy DRX mode). In another such example, a mobile device may impose a maximum velocity limit. For example, a mobile device which is moving fast enough, may move into an area of poor reception before the next active paging duration.

In some embodiments, the device may only skip redundant DRX cycles. For example, many wireless technologies implement a fixed number of pages. Consider a base station that pages a device four (4) times, the device can skip all but one (1) of the pages, and still successfully decode the paging message. In some variants, the mobile device can further adjust DRX cycle performance by increasing or decreasing the number of skipped pages.

In an alternate embodiment of the method 300, if the mobile device is stationary, then the mobile device can skip one or more radio environment measurements. For example, where a LTE mobile device has not moved significantly, the mobile device will still be within reception range of its serving cell, and presumably the neighboring cells. Since the radio environment has not changed, the mobile device's previously measured mobility information likely remains accurate. By reducing radio measurements, the mobile device can reduce its overall power consumption.

Moreover, while the foregoing discussion has disclosed several low power mode schemes, it is appreciated that an artisan of ordinary skill may implement other low power reception modes, given the contents of the present disclosure. For example, a mobile device may provide the information to its serving base station, and responsively both the base station and the mobile station negotiate an alternate paging schedule (i.e., as opposed to executing the fixed progression of DRX lengths). In another such example, a mobile device may switch between Single Input Single Output (SISO) and Multiple Input Multiple Output (MIMO) operation for paging cycle reception. In still other embodiments, a mobile device may reduce its reception gain, according to the likelihood of properly receiving DRX transmissions.

At step 306 of the method 300, the mobile device enters the low power mode. In one exemplary embodiment, the low power mode is characterized by skipping one or more DRX cycles. Specifically, a mobile device only powers on for a subset of all paging occasions (PO).

Example Operation—

Figure 4:
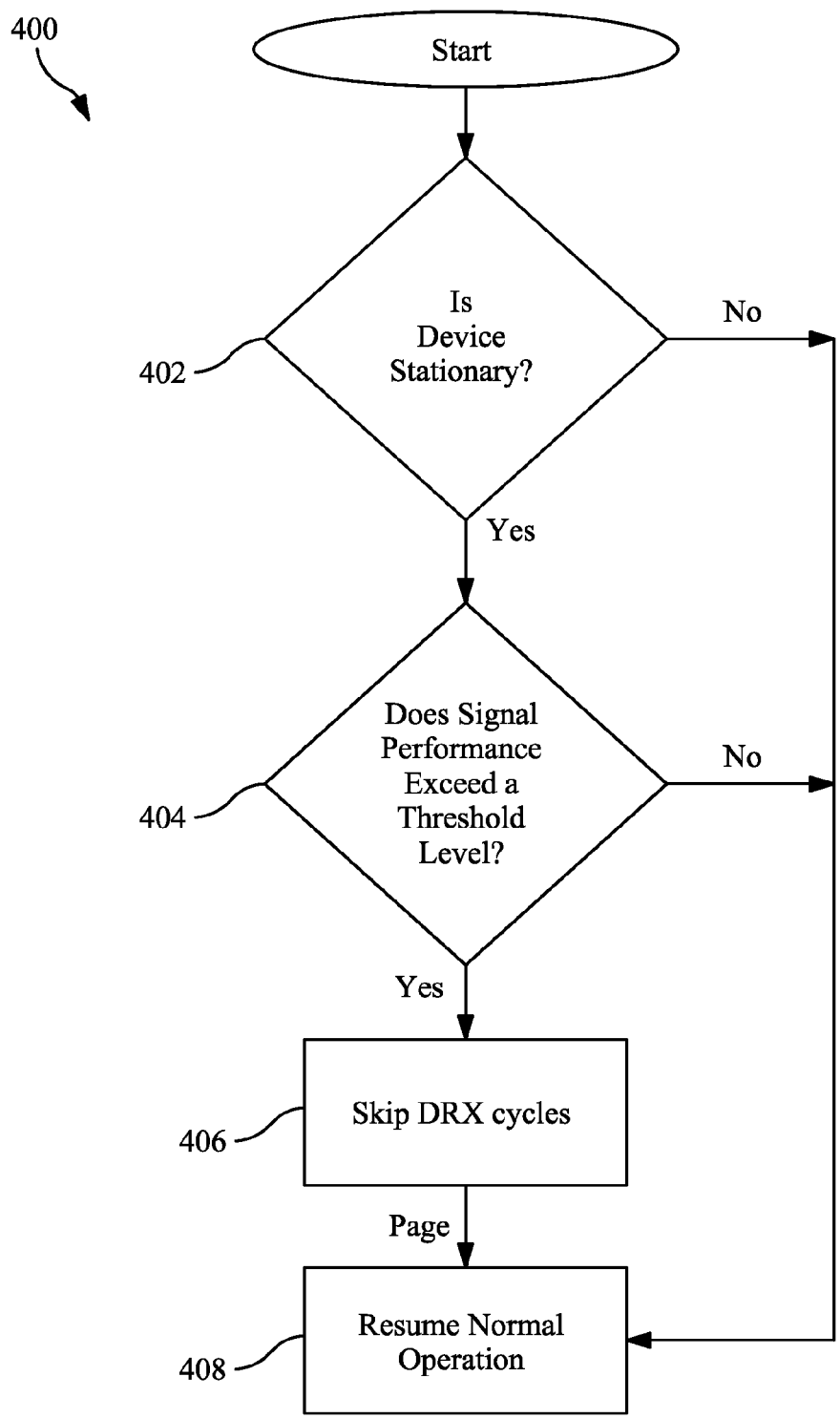
FIG. 4 is a logical flow diagram of one exemplary embodiment of a method for power optimization of a mobile device in an idle state.

Referring now to FIG. 4, one exemplary method 400 for power optimization of a mobile device in an idle state is shown. At step 402 of the method 400, the mobile device determines if it is stationary based on e.g., GPS coordinates and/or signal measurements of one or more cells. For example, a mobile device may store Received Signal Strength Indications (RSSI) for its serving cell and one or more neighbor cells. A stationary mobile device will not see substantial changes in RSSI for each cell (some amount of "breathing" is considered normal).

At step 404 of the method 400, the mobile device determines whether signal performance exceeds a threshold level. In one exemplary embodiment, the signal performance is measured as the Signal-to-Noise Ratio (SNR) of a Physical Downlink Control Channel (PDCCH). Alternate metrics may include, without limitation, Cyclic Redundancy Checks (CRC), Signal-to-Interference-plus-Noise Ratio (SINR), Carrier-to-Interference-plus-Noise Ratio (CINR), Bit Error Rate (BER), Block Error Rate (BLER), Packet Error Rate (PER), etc.

At step 406, if the mobile device is stationary and signal performance exceeds an minimum threshold level, the mobile device configures itself to skip one or more DRX cycles. In one embodiment of the present invention, the mobile device skips all but one of the DRX cycles. By reducing the amount of time the receiver needs to be active, the mobile device can greatly improve power consumption.

At step 408, responsive to receiving a paging indication, the mobile device resumes normal operation. In alternate embodiments, the mobile device may discontinue skipping DRX cycles if performance falls below acceptable thresholds (e.g., where excessive paging messages are dropped, signal quality falls unexpectedly, etc.)

Exemplary Mobile Device—

Figure 5:
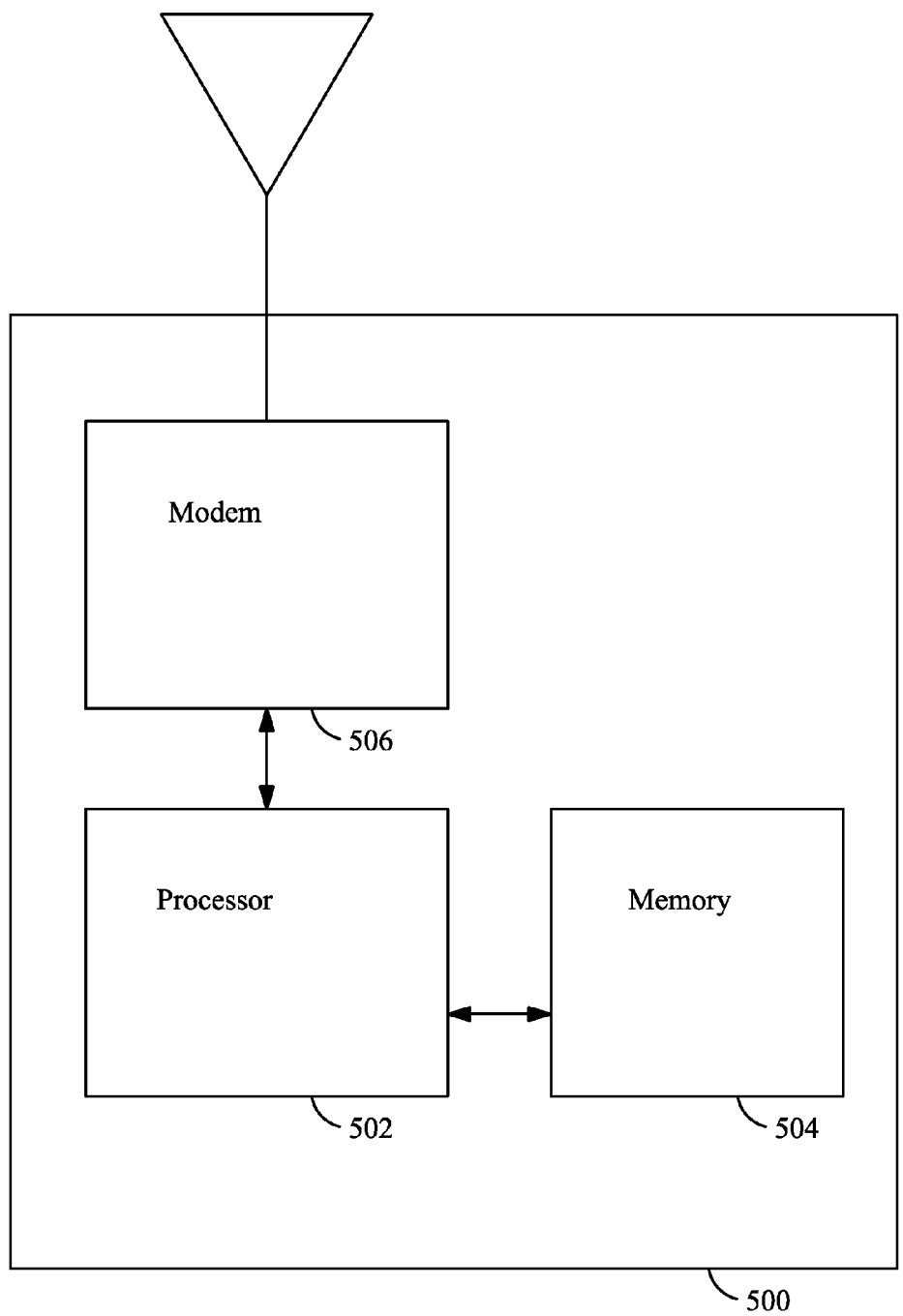
FIG. 5 is a functional block diagram of one embodiment of a mobile device configured according to various aspects of the present invention.

Referring now to FIG. 5, an exemplary user device apparatus 500 configured for power optimization (e.g., idle mode current drain optimization) is illustrated. As used herein, the term "user device" includes, but is not limited to cellular telephones, smartphones (such as for example an iPhone™ manufactured by the Assignee hereof), handheld computers, personal media devices (PMDs), or any combinations of the foregoing. While a specific device configuration and layout is shown and discussed, it is recognized that many other implementations may be readily implemented by one of ordinary skill given the present disclosure, the apparatus 500 of FIG. 5 being merely illustrative of the broader principles of the invention.

The processing subsystem 502 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 504, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The processing subsystem may also comprise additional co-processors, such as a dedicated graphics accelerator, network processor (NP), or audio/video processor. As shown processing subsystem 502 includes discrete components; however, it is understood that in some embodiments they may be consolidated or fashioned in a SoC (system-on-chip) configuration.

The apparatus 500 further includes one or more wireless interfaces 506 which are configured to receive transmissions from a wireless network. In one exemplary embodiment, the wireless interface includes a Long Term Evolution (LTE) transceiver, comprising one or more antennas and a baseband processor.

In one such variant, the baseband processor is further configured for implementing the power optimization methods or protocols described previously herein. In one implementation, the processor includes algorithms to implement paging reception during DRX operation according to at least a low power mode; e.g., by skipping one or more DRX cycles based on e.g., one or more measured reception characteristics.

Exemplary Base Station Device—

Figure 6:
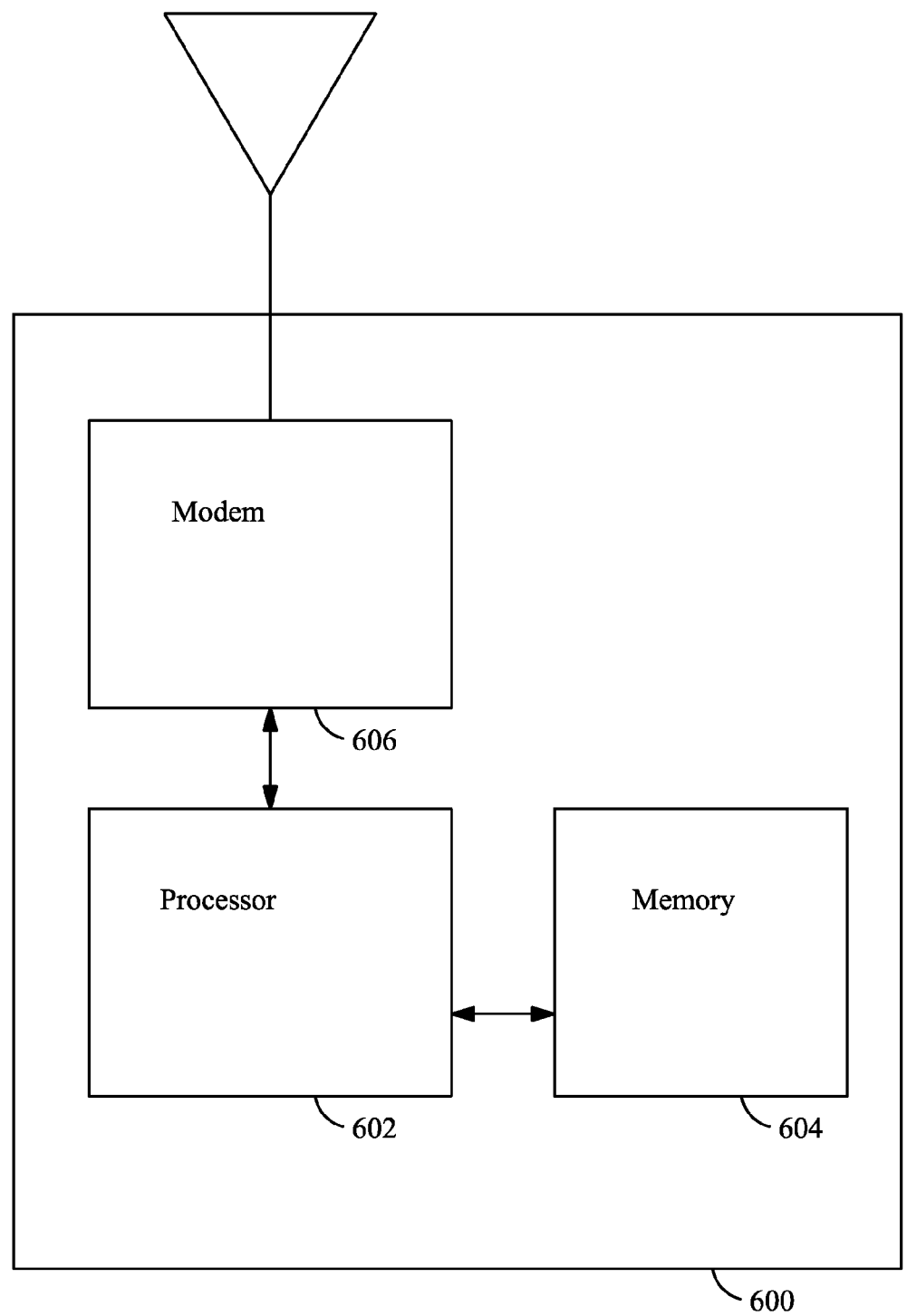
FIG. 6 is a functional block diagram of one embodiment a base station device configured according to various aspects of the present invention.

Referring now to FIG. 6, an exemplary base station apparatus 600 supporting power optimization (such as e.g., idle mode current drain optimization) for a mobile device is illustrated. As used herein, the term "base station" includes, but is not limited to macrocells, microcells, femtocells, picocells, wireless access points, or any combinations of the foregoing. While a specific device configuration and layout is shown and discussed, it is recognized that many other implementations may be readily implemented by one of ordinary skill given the present disclosure, the apparatus 600 of FIG. 6 being merely illustrative of the broader principles of the invention.

The processing subsystem 602 includes one or more of central processing units (CPU) or digital processors, such as a microprocessor, digital signal processor, field-programmable gate array, RISC core, or plurality of processing components mounted on one or more substrates. The processing subsystem is coupled to non-transitory computer-readable storage media such as memory 604, which may include for example SRAM, FLASH, SDRAM, and/or HDD (Hard Disk Drive) components. As used herein, the term "memory" includes any type of integrated circuit or other storage device adapted for storing digital data including, without limitation, ROM. PROM, EEPROM, DRAM, SDRAM, DDR/2 SDRAM, EDOXPMS, RLDRAM, SRAM, "flash" memory (e.g., NAND/NOR), and PSRAM. The processing subsystem may also comprise additional co-processors. As shown processing subsystem 602 includes discrete components; however, it is understood that in some embodiments they may be consolidated or fashioned in a SoC (system-on-chip) configuration.

The apparatus 600 further includes one or more wireless interfaces 606 which are configured to receive transmissions from mobile devices. In one exemplary embodiment, the wireless interface includes a Long Term Evolution (LTE) transceiver, comprising one or more antennas and a baseband processor.

In one such variant, the baseband processor is further configured for paging transmission during DRX operation. In one exemplary embodiment, the paging transmissions are further configured to assist a mobile device in executing a low power mode operation.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A mobile wireless device capable of optimizing power consumption, the device comprising:
   a power supply;
   a wireless transceiver;
   logic in communication with the transceiver and configured to:
      evaluate one or more parameters associated with the mobile device; and
      select only a subset of instances of a substantially redundant aspect of the operation of the wireless transceiver during which to energize the transceiver, wherein the substantially redundant aspect comprises redundant checks for pages directed to the mobile device, the selection being based at least in part on the evaluation of the one or more parameters, wherein the selection of only a subset of instances comprises selection of only a subset of a plurality of prescribed intervals during which the mobile device is scheduled to receive pages, wherein the logic is further configured to utilize only a portion of each of the selected subset of prescribed intervals, wherein the utilizing only a portion of each of the subset comprises skipping at least one page directed to the mobile device during each of the subset of intervals.

2. The device of claim 1, wherein the selection of only a subset of instances reduces the power consumed by the transceiver as compared to that if no subset was selected.

3. The device of claim 2, wherein the selection of only a subset of instances of the checking does not adversely affect an ability of a mobile device to receive a page.

4. The device of claim 2, wherein the evaluation of the one or more parameters comprises evaluation of whether a signal strength associated with a base station has changed greater than a prescribed amount over a prescribed interval of time.

5. The method of claim 1, wherein the mobile device comprises a long term evolution (LTE) enabled cellular device, and the substantially redundant aspect comprises a discontinuous reception (DRX) mode of operation.

6. A method of optimizing the power consumption of a mobile wireless device, wherein the consumption of power comprises at least turning on a receiver portion of a radio frequency modem of the device, the wireless device comprising a substantially redundant aspect of its operation, the method comprising:
   evaluating one or more parameters associated with the mobile device; and
   selecting only a subset of instances of the substantially redundant aspect during which to consume power, wherein the substantially redundant aspect comprises redundant checks for pages directed to the mobile device, the selecting being based at least in part on the evaluating of the one or more parameters, wherein the selection of only a subset of instances comprises selection of only a subset of a plurality of prescribed intervals during which the mobile device is scheduled to receive pages;
   utilizing only a portion of each of the selected subset of prescribed intervals, wherein the utilizing only a portion of each of the subset comprises skipping all but one of a plurality of pages directed to the mobile device during each of the subset of intervals.

7. The method of claim 6, wherein the one or more parameters comprise one or more parameters related to the quality of the radio frequency environment in which the mobile device is then operating.

8. The method of claim 6, wherein the one or more parameters comprise one or more parameters related to the likelihood that the mobile device will successfully receive a page intended for it.

9. The method of claim 6, wherein the mobile device comprises a long term evolution (LTE) enabled cellular device, and the substantially redundant aspect comprises a discontinuous reception (DRX) mode of operation.

10. A method of optimizing the power consumption of a mobile wireless device, the wireless device comprising a substantially redundant aspect of its operation, the method comprising:
    evaluating one or more parameters associated with the mobile device;
    selecting only a subset of instances of the substantially redundant aspect during which to consume power, wherein the substantially redundant aspect comprises redundant checks for pages directed to the mobile device, the selecting being based at least in part on the evaluating of the one or more parameters, wherein the selection of only a subset of instances comprises selection of only a subset of a plurality of prescribed intervals during which the mobile device is scheduled to receive pages; and
    utilizing only a portion of each of the selected subset of prescribed intervals, wherein the utilizing only a portion of each of the subset comprises skipping at least one page directed to the mobile device during each of the subset of intervals.

11. The method of claim 10, wherein the one or more parameters comprise one or more parameters related to the quality of the radio frequency environment in which the mobile device is then operating.

12. The method of claim 10, wherein the one or more parameters comprise one or more parameters related to the likelihood that the mobile device will successfully receive a page intended for it.

13. The method of claim 10, wherein the evaluation of the one or more parameters comprises evaluation of whether a signal strength associated with a base station has changed greater than a prescribed amount over a prescribed interval of time.

14. The method of claim 10, wherein the selection of only a subset of instances reduces the power consumed by the transceiver as compared to that if no subset was selected.

15. The method of claim 10, wherein the selection of only a subset of instances of the checking does not adversely affect an ability of a mobile device to receive a page.

* * * * *